United States Patent [19]

Marino et al.

[11] Patent Number: 5,640,279

[45] Date of Patent: Jun. 17, 1997

[54] BEAM SPLITTER FOR OPTICAL READING AND WRITING ACTUATOR

[75] Inventors: Philip F. Marino; Charles J. Simpson, both of Rochester, N.Y.

[73] Assignee: Eastman Kodak Company, Rochester, N.Y.

[21] Appl. No.: 657,575

[22] Filed: Jun. 7, 1996

[51] Int. Cl.⁶ .................... G02B 7/02; G11B 7/00
[52] U.S. Cl. .............. 359/822; 359/823; 369/44.14; 369/44.15
[58] Field of Search .................. 359/822, 823, 359/813, 814, 824; 369/44.14, 44.15, 44.16

[56] References Cited

U.S. PATENT DOCUMENTS

| | | | |
|---|---|---|---|
| 4,557,564 | 12/1985 | van Rosmalen | 369/44.15 |
| 4,818,069 | 4/1989 | Maan | 359/823 |
| 4,912,693 | 3/1990 | Goda | 369/44 |
| 5,359,459 | 10/1994 | Kim | 359/824 |
| 5,428,481 | 6/1995 | Ikegame | 359/811 |
| 5,440,533 | 8/1995 | Fujimaki | 369/44.18 |
| 5,500,771 | 3/1996 | Tomiyama | 359/813 |
| 5,515,353 | 5/1996 | Miyazaki | 369/112 |
| 5,535,059 | 7/1996 | Mitsumori | 359/813 |

*Primary Examiner*—Georgia Y. Epps
*Assistant Examiner*—Ricky Mack
*Attorney, Agent, or Firm*—Raymond L. Owens

[57] ABSTRACT

An optical reading or writing actuator for directing a laser beam for reading or writing an optical medium including a base and an actuator assembly having an objective lens fixed in the assembly and flexures for supporting the actuator assembly for movement in focus and tracking directions to position the objective lens. The actuator further includes at least one sensor disposed relative to the actuator assembly for producing an output tracking position signal and a beam splitter positioned relative to the actuator assembly and the sensor for directing a portion of the laser beam to the sensor and for directing another portion of the laser beam to the objective lens which focuses it on the optical medium.

6 Claims, 2 Drawing Sheets

5,640,279

BEAM SPLITTER FOR OPTICAL READING AND WRITING ACTUATOR

FIELD OF THE INVENTION

The present invention relates to optical reading and writing actuators which project a laser beam onto optical storage media such as disks.

BACKGROUND OF THE INVENTION

Reading and writing actuators which are moveable in focus and tracking positions include an objective lens. These actuators are often used in optical disc recording devices to control the objective lens position relative to rotating disc. This is necessary because of unavoidable warp of the disc, spindle errors, and other mechanical and optical imperfections. Both focus (controlled by the distance between the lens and the disc surface) and tracking (the correct radial position of the lens so as to read or write a single track at a time) must be maintained. The motions of the actuator are controlled by a servo system.

As shown in FIG. 1, typically, an actuator 9 receives a read/write light beam from a laser 10 directed by a reflective surface 12 to an actuator assembly 14 which includes an objective lens 14a. This limits the compactness of the actuator. The actuator assembly 14 is mounted on flexures 18 fixed to a base 20. The actuator assembly 14 typically has two magnetic assemblies (not shown) that supply the magnetic fields used by actuator motors. The actuator assembly 14 includes at least one position sensor (not shown) which has its own dedicated light source, commonly an LED. This arrangement adds cost, complexity, and reduces reliability.

SUMMARY OF THE INVENTION

It is therefore an object of the present invention to provide an improved reading and writing actuator which eliminates the need for a separate light source for a position sensor and allows for a more compact actuator.

This object is achieved by an optical reading or writing actuator for directing a laser beam for reading or writing an optical medium, comprising:

a) a base;

b) an actuator assembly having an objective lens fixed in the assembly;

c) flexure means for supporting the actuator assembly for movement in focus and tracking directions to position the objective lens;

d) sensor means disposed relative to the actuator assembly and including at least one sensor for producing an output tracking position signal; and e) a beam splitter positioned relative to the actuator assembly and the sensor means for directing a portion of the laser beam to the sensor means and for directing another portion of the laser beam to the objective lens which focuses it on the optical medium.

Advantages

An advantage of the invention is that a portion of the read/write light beam is used to illuminate a position sensor thereby reducing the need for an extra light source and associated electronics. It is still another advantage of the present invention that the beam splitter arrangement reduces the overall height of optical head/actuator assembly and makes it more compact.

DETAILED DESCRIPTION OF THE INVENTION

Figure 1:
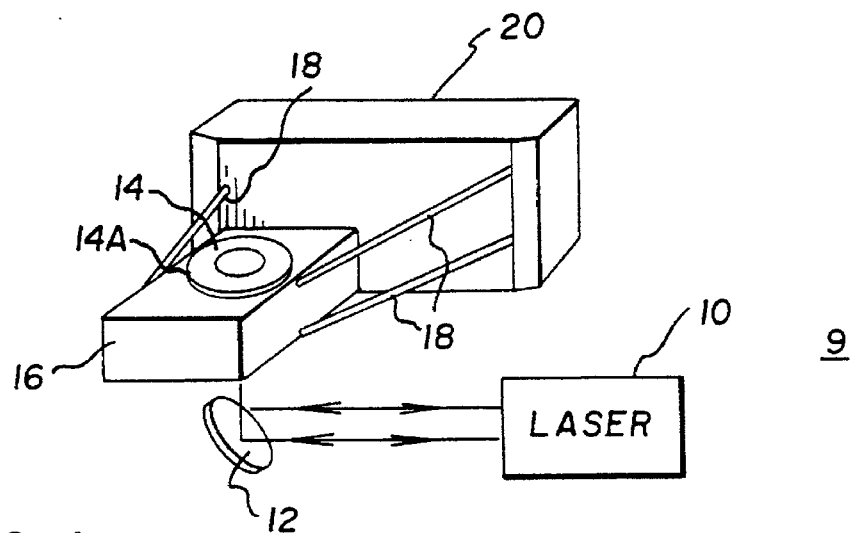
FIG. 1 is a schematic arrangement of a prior art actuator.
Figure 2:
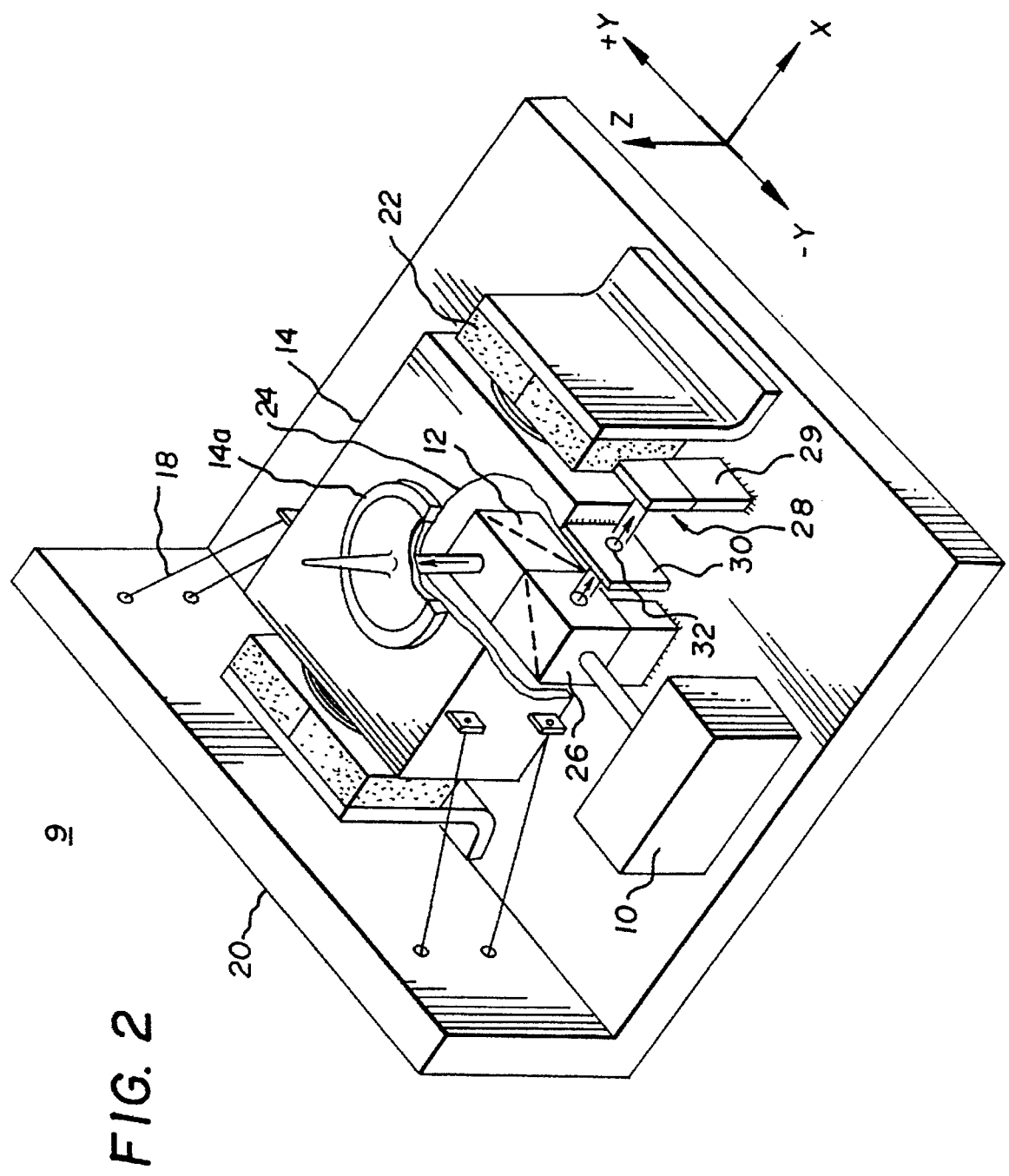
FIG. 2 is a perspective of an actuator in accordance with the present invention.

Turning now to FIG. 2 where parts correspond to those used in FIG. 1, the same numbers will be used. The actuator 9 includes a moveable actuator assembly 14 mounted on flexures 18. There are actually four flexures 18. For a more complete description of the flexures, reference can be made to commonly assigned U.S. patent application Ser. No. 60/005,022 filed Oct. 10, 1995 to Philip F. Marino, the disclosure of which is incorporated herein by reference. The flexures 18 can be of molded plastic, formed metal, or metal wire construction. The actuator assembly 14 has an objective lens 14a which focuses laser light onto an optical disk (not shown) for recording or playback. The actuator assembly 14 is driven by two, three, or four-coil surface motors, as described in U.S. Provisional Ser. No. 60/005,396, filed Oct. 6, 1995 by Phil Marino, Chuck Simpson, and Paul Heppner (Docket 72559). The coils are shown mounted within the moveable actuator assembly 14, with magnets 22 mounted or fixed to the base 20. As shown the moveable actuator assembly 14 includes a cut-out portion 24. This arrangement provides for a compact actuator and permits a minimum overall height in the focus direction (sometimes referred to in the art as the Z direction).

Figure 3:
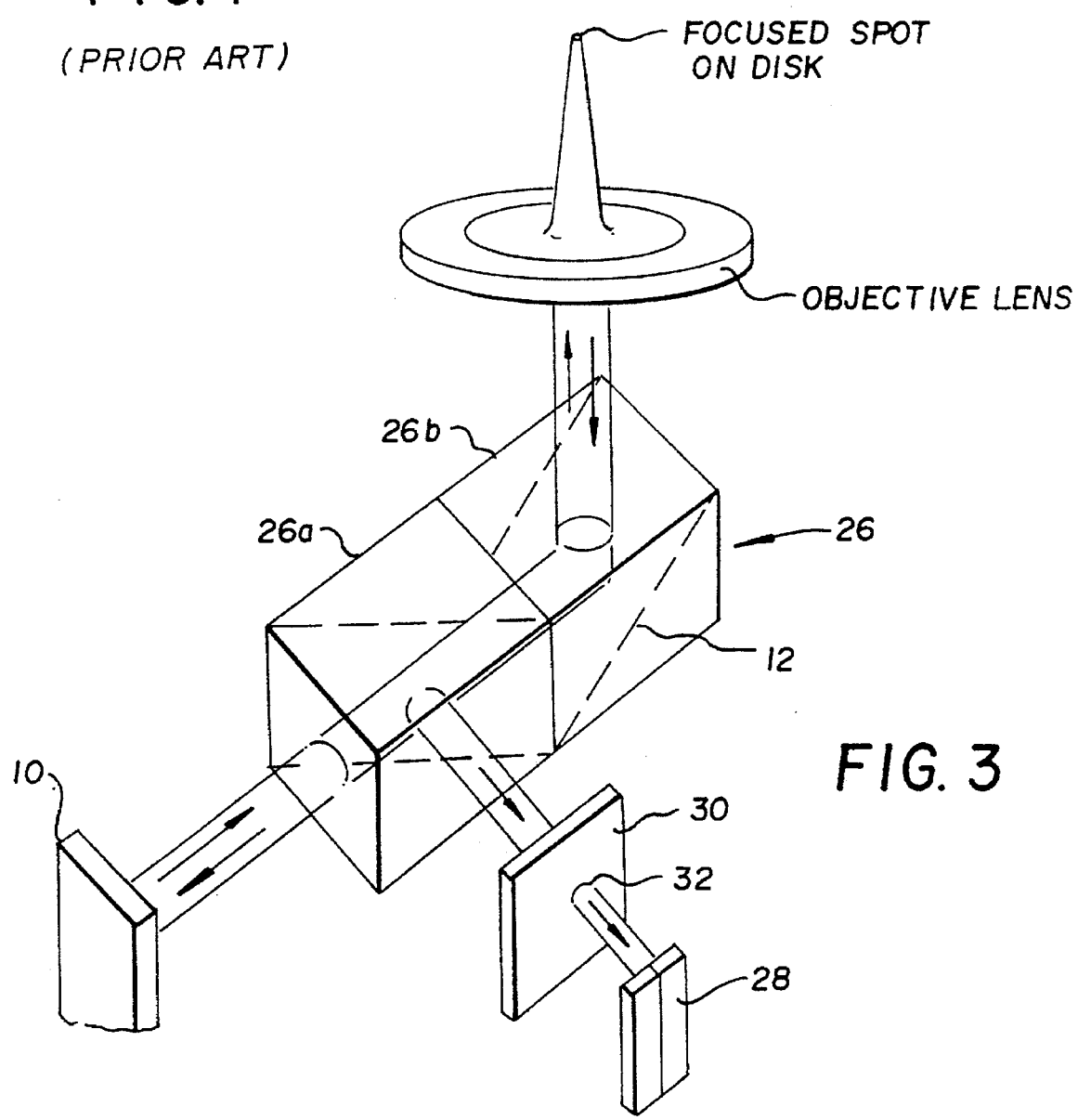
FIG. 3 is a partial view of the beam splitter and aperture element of the actuator of FIG. 2.

As shown in FIG. 2, the beam splitter 26 is positioned within the actuator cut-out portion 24. FIG. 3 shows the beam splitter 26 in more detail. The beam splitter 26 receives a collimated beam of laser light from a laser 10. It will be understood that there is also provided optics for collimating the laser beam, but these are not shown for clarity of illustration. The laser beam enters the beam splitter 26 and is split into two portions. The main portion of the beam is directed up to the objective lens 14a. The other portion of the beam is directed to a position sensor 28. The position sensor 28 is fixed to a support 29 (see FIG. 2) which is fixed to the base 20. The position sensor 28 is shown with two photosensitive areas (or bi-cell), which detects tracking position, but those skilled in the art will recognize that a quad cell could also be used which would provide both tracking and focus position information. Positioned between the beam splitter 26 and the position sensor 28 is an aperture plate 30 which is fixed to the moveable actuator assembly 14 (see also FIG. 2). It includes an aperture 32. The beam of laser light passes through the aperture 32 and illuminates the position sensor 28.

Preferably, the beam splitter 26 functionally includes two elements or beam diverting parts 26a and 26b. The first part 26a of the beam splitter 26 diverts a small (typically 1% to 10%) portion of the energy of the original beam towards the position sensor 28 (typically referred to as the +X direction shown in FIG. 2). The diverted beam then passes into the aperture 32 fixed to lens mount, and then continues until it illuminates the position sensor 28. Part 26a typically can be a partially reflective element which has a thin aluminum coating. Such elements are commercially available. Information from the position sensor 28 can be used to determine the motion of the objective lens 14a of the actuator with respect to the actuator base 20. This is information useful in controlling the actuator motors as is well understood in the art.

Most of the energy from the light beam from the laser 10 passes through the first part 26a and is diverted by the second part 26b. Part 26b is preferably includes the reflective surface 12 that causes the beam to travel upward (in the +Z direction) through the objective lens 14a to form a spot on the disk.

The beam splitter 26, by being positioned into the cut-out portion 24 of the actuator assembly 14, physically limits the movement of the actuator in the Z direction by engaging the actuator assembly walls and thereby serves to limit the travel of the actuator assembly and its objective lens 14a. A stop in the form of a pin can be mounted on the base 20 to limit the travel of the actuator assembly 14 in the +Y direction while the beam splitter 26 will serve the limit of the actuator in the −Y direction.

The invention has been described in detail with particular reference to certain preferred embodiments thereof, but it will be understood that variations and modifications can be effected within the spirit and scope of the invention.

Parts List 9 actuator
10 laser
12 reflective surface
14 moveable actuator assembly
14a objective lens
18 flexures
20 actuator base
22 magnets
24 actuator cut-out portion
26 beam splitter
26a beam diverting parts
26b beam diverting parts
28 position sensor
28a beam splitter part
28b beam splitter part
29 support
30 aperture plate
32 aperture

We claim:

1. An optical reading or writing actuator for directing a laser beam for reading or writing an optical medium, comprising:

(a) a base;
(b) an actuator assembly having an objective lens fixed in the assembly and a cut-out portion;
(c) flexure means for supporting the actuator assembly for movement in focus and tracking directions to position the objective lens;
(d) sensor means disposed relative to the actuator assembly and including at least one sensor for producing an output tracking position signal; and
(e) a beam splitter for directing a portion of the laser beam to the sensor means and for directing another portion of the laser beam to the objective lens which focuses it on the optical medium, the beam splitter being disposed in the actuator cut-out portion but spaced from the actuator so that the beam splitter provides a travel limitation for the actuator assembly in the focus direction.

2. An optical reading or writing actuator for directing a laser beam for reading or writing an optical medium, comprising:

(a) a base;
(b) an actuator assembly having an objective lens fixed in the assembly and a cut-out portion;
(c) flexure means for supporting the actuator assembly for movement in focus and tracking directions to position the objective lens;
(d) sensor means disposed relative to the actuator assembly and including at least one sensor for producing an output tracking position signal; and
(e) a two-part beam splitter for receiving the laser beam and including two spaced apart surfaces, the first being a partially reflective surface and directing a portion of the laser beam to the sensor means and the second being reflective for directing another portion of the laser beam to the objective lens which focuses it on the optical medium, the beam splitter being disposed in the cut-out portion but spaced from the actuator so that the beam splitter provides a travel limitation for the actuator assembly in the focus direction.

3. An optical reading or writing actuator for directing a laser beam for reading or writing an optical medium, comprising:

(a) a base;
(b) an actuator assembly having an objective lens fixed in the assembly;
(c) flexure means for supporting the actuator assembly for movement in focus and tracking directions to position the objective lens;
(d) sensor means disposed relative to the actuator assembly and including at least one sensor for producing an output tracking position signal;
(e) a two-part beam splitter positioned relative to the actuator assembly and the sensor means for receiving the laser beam and including two spaced apart surfaces, the first being a partially reflective surface for directing a portion of the laser beam to the sensor means and the second being reflective for directing another portion of the laser beam to the optical medium; and
(f) an element mounted on the actuator assembly and defining an aperture disposed between the beam splitter and the sensor means for permitting the laser beam portion reflected from the partially reflective surface to illuminate the sensor means.

4. The optical reading or writing actuator according to claim 3 wherein the actuator assembly includes a cut-out portion, the beam splitter being disposed in the cut-out portion but spaced from the actuator so that the beam splitter provides a travel limitation for the actuator lens mount in the focus direction.

5. An optical reading or writing actuator for directing a laser beam for reading or writing an optical medium, comprising:

(a) a base;
(b) an actuator assembly having an objective lens fixed in the assembly and a cut-out portion;
(c) flexure means for supporting the actuator assembly for movement in focus and tracking directions to position the objective lens;
(d) sensor means disposed relative to the actuator assembly and including at least one sensor for producing an output tracking position signal; and
(e) a beam splitter for directing a portion of the laser beam to the sensor means and for directing another portion of the laser beam to the objective lens which focuses it on the optical medium, the beam splitter being disposed in the actuator cut-out portion but spaced from the actuator so that the beam splitter provides a travel limitation in one direction for the actuator assembly in the tracking direction.

6. An optical reading or writing actuator for directing a laser beam for reading or writing an optical medium, comprising:

(a) a base;

(b) an actuator assembly having an objective lens fixed in the assembly and a cut-out portion;

(c) flexure means for supporting the actuator assembly for movement in focus and tracking directions to position the objective lens;

(d) sensor means disposed relative to the actuator assembly and including at least one sensor for producing an output tracking position signal; and (e) a two-part beam splitter for receiving the laser beam and including two spaced apart surfaces, the first being a partially reflective surface and directing a portion of the laser beam to the sensor means and the second being reflective for directing another portion of the laser beam to the objective lens which focuses it on the optical medium, the beam splitter being disposed in the cut-out portion but spaced from the actuator so that the beam splitter provides a travel limitation in one direction for the actuator assembly in the tracking direction.

* * * * *